(12) United States Patent
Wilson (10) Patent No.: US 11,585,962 B2
(45) Date of Patent: Feb. 21, 2023

(54) TRANSPARENT COVERING HAVING ANTI-REFLECTIVE COATINGS

(71) Applicant: Racing Optics, Inc., Las Vegas, NV (US)

(72) Inventor: Stephen S. Wilson, Las Vegas, NV (US)

(73) Assignee: Racing Optics, Inc., Las Vegas, NV (US)

( * ) Notice: Subject to any disclaimer, the term of this patent is extended or adjusted under 35 U.S.C. 154(b) by 417 days.

(21) Appl. No.: 16/584,648

(22) Filed: Sep. 26, 2019

(65) Prior Publication Data

US 2020/0124768 A1  Apr. 23, 2020

Related U.S. Application Data

(60) Provisional application No. 62/748,154, filed on Oct. 19, 2018.

(51) Int. Cl.
*G02B 1/11* (2015.01)
*G02B 1/113* (2015.01)
*G02B 3/00* (2006.01)

(52) U.S. Cl.
CPC ............ *G02B 1/113* (2013.01); *G02B 3/0068* (2013.01)

(58) Field of Classification Search
CPC ........ G02B 1/113; G02B 3/0068; G02B 3/00; G02B 1/11; G02B 1/111; G02B 1/115; B32B 18/00; B32B 7/023; B32B 7/12; B32B 9/04
See application file for complete search history.

(56) References Cited

U.S. PATENT DOCUMENTS

| 4,333,983 | A | 6/1982 | Allen |
| 4,716,601 | A | 1/1988 | Mcneal |
| 5,327,180 | A | * | 7/1994 | Hester, III ............... G02C 7/12 351/159.64 |
| 5,991,081 | A | 11/1999 | Haaland et al. |
| 6,531,180 | B1 | 3/2003 | Takushima et al. |
| 6,536,045 | B1 | 3/2003 | Wilson et al. |

(Continued)

FOREIGN PATENT DOCUMENTS

WO  2015093413 A1  6/2015

OTHER PUBLICATIONS

Patent Cooperation Treaty, International Search Report and Written Opinion for International Application No. PCT/US2019/054565, 9 pages, dated Dec. 20, 2019.
"Anti-reflective coating," Wikipedia, last updated Jul. 13, 2017 by Andy Dingley, https://en.m.wikipedia.org/wiki/Anti-reflective_coating.
"Monotonic function," Wikipedia, accessed May 24, 2017, https://en.wikipedia.org/wiki/Monotonic_function.

(Continued)

*Primary Examiner* — Balram T Parbadia
(74) *Attorney, Agent, or Firm* — Stetina Brunda Garred and Brucker (57) ABSTRACT

A transparent covering affixable to a substrate includes a stack of two or more lenses, an adhesive layer interposed between each pair of adjacent lenses from among the two or more lenses, a first anti-reflective coating on a first outermost lens of the stack, and a second anti-reflective coating on a second outermost lens of the stack opposite the first outermost lens. The first anti-reflective coating has a first design wavelength range, and the second anti-reflective coating has a second design wavelength range that is different from the first design wavelength range.

17 Claims, 5 Drawing Sheets

(56) References Cited

U.S. PATENT DOCUMENTS

| | | | |
|---|---|---|---|
| 6,773,816 B2 * | 8/2004 | Tsutsumi | B32B 17/10174 351/44 |
| 7,597,441 B1 * | 10/2009 | Farwig | G02C 7/108 351/44 |
| 7,722,921 B2 | 5/2010 | Shimoda et al. | |
| 8,693,102 B2 | 4/2014 | Wilson et al. | |
| 9,575,231 B2 | 2/2017 | Chu et al. | |
| 9,671,622 B1 * | 6/2017 | Vetrini | G02C 7/12 |
| 10,427,385 B2 | 10/2019 | Wilson et al. | |
| 10,520,756 B2 | 12/2019 | Gallina et al. | |
| 2005/0015860 A1 | 1/2005 | Reaux | |
| 2006/0056030 A1 | 3/2006 | Fukuda et al. | |
| 2008/0030675 A1 * | 2/2008 | Dillon | G02C 7/021 351/159.62 |
| 2009/0239048 A1 | 9/2009 | Sugihara et al. | |
| 2011/0168261 A1 | 7/2011 | Welser et al. | |
| 2012/0200816 A1 | 8/2012 | Krasnov et al. | |
| 2013/0089688 A1 | 4/2013 | Wilson et al. | |
| 2013/0141693 A1 * | 6/2013 | McCabe | B29C 45/14819 351/159.56 |
| 2013/0222913 A1 * | 8/2013 | Tomoda | G02C 7/105 427/164 |
| 2013/0247286 A1 | 9/2013 | Vanderwoude et al. | |
| 2015/0131047 A1 * | 5/2015 | Saylor | G02C 7/12 351/44 |
| 2015/0234209 A1 | 8/2015 | Miyamoto et al. | |
| 2015/0349147 A1 | 12/2015 | Xi et al. | |
| 2015/0359675 A1 | 12/2015 | Wilson | |
| 2016/0259102 A1 | 9/2016 | Taka | |
| 2016/0291543 A1 * | 10/2016 | Saito | G03H 1/0486 |
| 2017/0299898 A1 * | 10/2017 | Gallina | B32B 27/36 |
| 2018/0029337 A1 | 2/2018 | Wilson et al. | |
| 2018/0113327 A1 | 4/2018 | Ishak et al. | |
| 2019/0116300 A1 * | 4/2019 | Okuno | H04N 5/2254 |

OTHER PUBLICATIONS

"Thin Film," Wikipedia, last updated Jun. 20, 2017, <https://en.wikipedia.org/wiki/Thin_film>.

"Tips to Get Quality Anti-Reflection Optical Coatings," Penn Optical Coatings, accessed May 24, 2017, <http://www.pennoc.com/tipsgetqualityantireflectionopticalcoatings/>.

Langlet, M., "Antireflective Films", from Chapter 15 of Handbook of Sol-Gel Science and Technology Processing Characterization and Applications, copyright 2005, pp. 332-334, 337, 339-341., taken from website <https://books.google.com/books?id=i9swy1D2HxlC&lpg=PA339&dq=AR%20thick%20film%20coatings&pg=PA339#v=onepage&q=AR%20thick%20film%20coatings&f=false>.

Li, H.-M. et al., "Influence of weight ratio in polymer blend film on the phase separation structure and its optical properties", The European Physical Journal Applied Physics, 45, 20501, published Jan. 31, 2009, EDP Sciences, 4 pages.

MDS Nordion, "Gamma Compatible Materials," Datasheet, Aug. 2007, 4 pages, <https://ab-div-bdi-bl-blm.web.cern.ch/Radiation/Gamma_Compatible_Materials_List_company.pdf>, retrieved Sep. 29, 2021.

Zhang, Xin_Xiang et al., Abstract of "One-step sol-gel preparation of PDMS-silica ORMOSILs as environment-resistant and crack-free thick antireflective coatings," Journal of Materials Chemistry, Issue 26, 2012, <http://pubs.rsc.org/en/content/articlelanding/2012/m/c2jm31005h#!divAbstract>.

PCT International Search Report and Written Opinion for International Application No. PCT/US2019/054565, dated Dec. 20, 2019, 9 pages.

PCT International Search Report and Written Opinion for International Application No. PCT/US2017/044438, dated Det. 23, 2017, 12 pages.

European Patent Office, Extended European Search Report for Application No. 19873022.8, dated Jun. 27, 2022, 8 pages.

* cited by examiner

TRANSPARENT COVERING HAVING ANTI-REFLECTIVE COATINGS

CROSS-REFERENCE TO RELATED APPLICATIONS

This application relates to and claims the benefit of U.S. Provisional Application No. 62/748,154, filed Oct. 19, 2018 and entitled "TRANSPARENT COVERING HAVING ANTI-REFLECTIVE COATINGS," the entire disclosure of which is expressly incorporated herein by reference.

STATEMENT RE: FEDERALLY SPONSORED RESEARCH/DEVELOPMENT

Not Applicable

BACKGROUND

1. Technical Field

The present disclosure relates generally to transparent coverings for windows, eyewear, or display screens and, more particularly, to transparent coverings having multiple lenses stacked one over the other and adhered together by adhesive.

2. Related Art

In various contexts, it is advantageous to affix transparent coverings to some substrate. Windows of buildings or vehicles may be covered with transparent window films for tinting (e.g. for privacy), for thermal insulation, to block ultraviolet (UV) radiation, or for decoration. Protective eyewear (e.g. goggles, glasses, and facemasks for off-road vehicle use, medical procedures, etc.) may be covered with a stack of transparent lenses for easy tear-away as the eyewear becomes dirty and obstructs the wearer's vision. Display screens of mobile phones, personal computers, ATMs and vending terminals, etc. may be covered with protective lenses to prevent damage to the underlying screen or block side viewing (e.g. for privacy and security in public places). When using such coverings, anti-reflective coatings may be implemented in order to reduce unwanted reflections, which may be especially problematic in multi-layer coverings that provide multiple interfaces at which incident light may reflect. However, typical anti-reflective coatings may not adequately reduce reflections over the whole visible spectrum (about 390 to 700 nm). Depending on the design wavelength range of the anti-reflective coating, this could result in a noticeable blue reflection (around 450 nm) or red reflection (around 700 nm) when light is incident on the transparent covering.

BRIEF SUMMARY

The present disclosure contemplates various systems, methods, and apparatuses, for overcoming the above drawbacks accompanying the related art. One aspect of the embodiments of the present disclosure is a transparent covering affixable to a substrate. The transparent covering includes a stack of two or more lenses, an adhesive layer interposed between each pair of adjacent lenses from among the two or more lenses, a first anti-reflective coating on a first outermost lens of the stack, and a second anti-reflective coating on a second outermost lens of the stack opposite the first outermost lens. The first anti-reflective coating has a first design wavelength range, and the second anti-reflective coating has a second design wavelength range that is different from the first design wavelength range.

The first design wavelength range may be centered at around 550 nm and the second design wavelength range may be centered at around 450 nm.

The first anti-reflective coating and the second anti-reflective coating may have different thicknesses. The first anti-reflective coating may comprise a film of magnesium fluoride ($MgF_2$) having a thickness of around 100 nm, and the second anti-reflective coating may comprise a film of magnesium fluoride ($MgF_2$) having a thickness of around 82 nm.

The transparent covering may exhibit normal-incidence reflectance of under 10% for all wavelengths between 390 nm and 700 nm.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of a transparent covering having anti-reflective (AR) coatings. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that relational terms such as first and second and the like are used solely to distinguish one from another entity without necessarily requiring or implying any actual such relationship in order between such entities.

Figure 1:
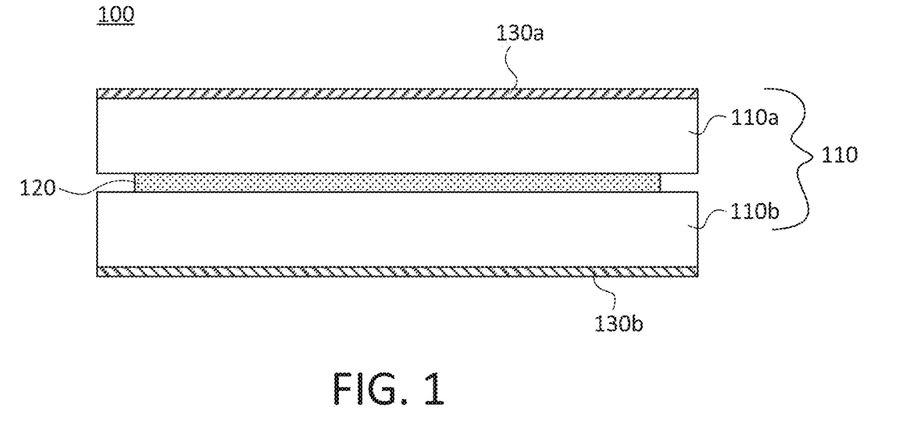
FIG. 1 is schematic side view of a transparent covering according to an embodiment of the present disclosure.

FIG. 1 is schematic side view of a transparent covering 100 according to an embodiment of the present disclosure. Depending on its particular purpose, the transparent covering 100 may be affixed to a substrate such as a window (for tinting, thermal insulation, blocking ultraviolet (UV) radiation, decoration, etc.) protective eyewear (e.g. for easy tear-away), or a display screen (e.g. for scratch protection, side view blocking, etc.). The transparent covering 100 may include a stack of two or more lenses 110a, 110b (collectively lenses 110), an adhesive layer 120 interposed between each pair of adjacent lenses 110 of the stack, and AR coatings 130a, 130b on the outermost lenses 110 of the stack. In the example of FIG. 1, two lenses 110 are shown. However, a stack of three or more lenses 110 is also contemplated, with the number of lenses 110 depending on the particular application. The transparent covering 100 may be affixed to the substrate by adhesive, for example, in selective areas around the periphery of the transparent covering 100 as described in U.S. Pat. No. 6,536,045, the entire contents of which is expressly incorporated herein by reference. The adhesive used to affix the transparent covering 100 to the substrate may be the same as or different from (e.g. stronger than) that of the adhesive layers 120 interposed between each pair of adjacent lenses 110 of the stack. A stronger adhesive may be used, for example, in a case where individual lenses 110 are to be torn off without removing the entire transparent covering 100 from the substrate. The transparent covering 100 may instead be affixed by other means, for example, using tension posts of a racing helmet as described in U.S. Pat. No. 8,693,102, the entire contents of which is expressly incorporated herein by reference.

The lenses 110 may be a clear polyester and may be fabricated from sheets of plastic film sold under the registered trademark Mylar owned by the DuPont Company, such as a type of Mylar made from a clear polymer polyethylene terephalate, commonly referred to as PET. The lenses 110 and adhesive layers 120 may have an index of refraction between 1.40 and 1.52. The thickness of each lens 110 may be between 0.5 mil and 7 mil (1 mil is 0.001"), for example, 2 mil. Even after the adhesive material of the adhesive layers 120 is applied to a 2 mil thickness lens 110, the thickness of the 2 mil thickness lens 110 may still be 2 mil due to the adhesive layer 120 having only a nominal thickness. The term "wetting" can be used to describe the relationship between the laminated lenses 110. When viewing through the laminated lenses 110, it may appear to be one single piece of plastic film.

The adhesive layers 120 used to laminate the lenses 110 together may be made of a clear optical low tack material and may comprise a water-based acrylic optically clear adhesive or an oil-based clear adhesive. After the lenses 110 are laminated or otherwise bonded together with the interposed adhesive layers 120, the thickness of each adhesive layer 120 may be negligible even though the adhesive layers 120 are illustrated as distinct layers in FIG. 1.

Figure 2:
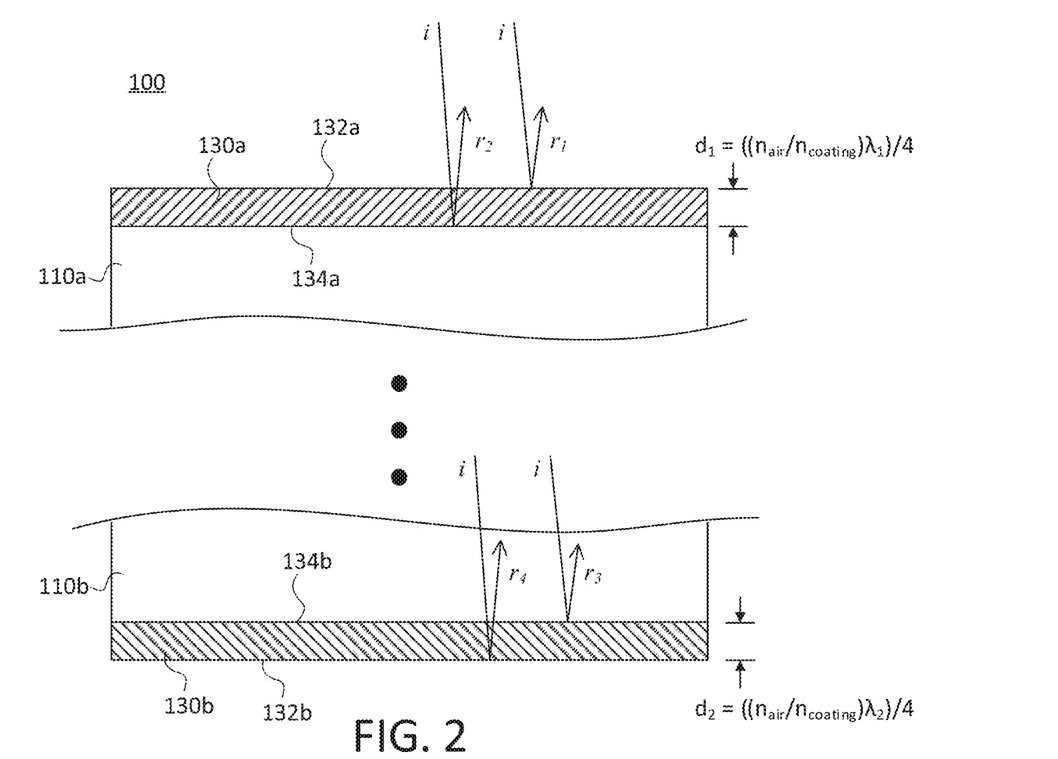
FIG. 2 is a closeup view of the outermost surfaces of the transparent covering shown in FIG. 1.

FIG. 2 is a closeup view of the outermost surfaces of the transparent covering 100 shown in FIG. 1. In the upper portion of FIG. 2, a first outermost lens 110a is shown coated with the first AR coating 130a. In the example of FIG. 2, the first AR coating 130a is a thin film AR coating that operates on the principle of destructive interference. A ray of light i (e.g. sunlight) incident on the transparent covering 100 first crosses a first interface 132a between the external environment (e.g. air) and the first AR coating 130a and thereafter crosses a second interface 134a between the first AR coating 130a and the first outermost lens 110a. At each interface 132a, 134a, a portion of the light i is reflected to produce a reflection ray $r_1$, $r_2$. By appropriately selecting a material and thickness of the first AR coating 130a, the reflection ray $r_2$ produced at the interface 134a may be 180° out of phase with the reflection ray $r_1$ produced at the interface 132a for a given range of wavelengths referred to as the design wavelength range (which may be centered at a given wavelength referred to as the design wavelength). The resulting reflection rays $r_1$, $r_2$ may thus destructively interfere with each other (i.e. peaks canceling troughs), such that the transparent covering 100 exhibits reduced reflection of light for wavelengths falling within the design wavelength range.

The AR coating 130a may be a single thin film of magnesium fluoride ($MgF_2$), which is a common material used in single-layer interference AR coatings due to its relatively low index of refraction ($n_D \approx 1.37$, where $n_D$ refers to the index of refraction at the Fraunhofer "D" line) suitable for use on many transparent materials. However, any known AR coating materials and structures may be used, including multi-layer interference structures. The thickness of the first AR coating 130a may be selected to optimize the reduction in reflection for a desired design wavelength range. For example, in a case where the first AR coating 130a is a single-layer interference AR coating, the thickness of the first AR coating 130a may be a so-called quarter-wavelength thickness, for example, thickness $d_1 = ((n_{air}/n_{coating})\lambda_1)/4$, where the design wavelength range is centered at $\lambda_1$, with $n_{air}$ being the index of refraction of the external medium, e.g. 1.00 for air, and $n_{coating}$ being the index of refraction of the first AR coating 130a, e.g. 1.37 for $MgF_2$. When the light i is incident at 90° to the transparent covering 100, the additional path length $2d_1$ traveled by the light through the first AR coating 130a, from the interface 132a to the interface 132b and back again, causes the reflection ray $r_1$ to be advanced by half a period (i.e. 180° out of phase) relative to the reflection ray $r_2$ for the design wavelength $\lambda_1$. This results in destructive interference between $r_1$ and $r_2$, causing reduced reflectance for the design wavelength $\lambda_1$. The effect may be less significant for off-normal incidence due to the angled path traveled by the light within the first AR coating 130a.

In the lower portion of FIG. 2, a second outermost lens 110b is shown coated with the second AR coating 130b. The second AR coating 130b may similarly be a thin film AR coating that operates on the principle of destructive interference. When the light i reaches the second AR coating 130b, it first crosses a third interface 134b between the second outermost lens 110b and the second AR coating 130b and thereafter crosses a fourth interface 132b between the second AR coating 130b and the external environment (e.g. air). At each interface 134b, 132b, a portion of the light i is reflected to produce a reflection ray $r_3$, $r_4$. Just like in the case of the first AR coating 130a, by appropriately selecting a material and thickness of the second AR coating 130b, the reflection ray $r_4$ produced at the interface 132b may be 180° out of phase with the reflection ray $r_3$ produced at the interface 134b for a given design wavelength range. The resulting reflection rays $r_3$, $r_4$ may thus destructively interfere with each other, such that the transparent covering 100 exhibits reduced reflection of light for wavelengths falling within the design wavelength range.

The second AR coating 130b may have a structure and function equivalent to that of the first AR coating 130a but with a different design wavelength range (e.g. a design wavelength range centered at a different design wavelength $\lambda_2 \neq \lambda_1$), as will be described in more detail below. For example, the second AR coating 130b may similarly be a single-layer interference AR coating whose thickness may be a so-called quarter-wavelength thickness, for example, thickness $d_2=((n_{air}/n_{coating})\lambda_2)/4$, where the design wavelength range is centered at $\lambda_2$, with $n_{air}$ being the index of refraction of the external medium, e.g. 1.00 for air, and $n_{coating}$ being the index of refraction of the second AR coating 130b, e.g. 1.37 for $MgF_2$. In this way, the design wavelength range of the second AR coating 130b may be adjusted (relative to that of the first AR coating 130a) by changing the thickness of the second AR coating 130b, without needing to use a different AR coating material or structural configuration. For example, in a case where the AR coatings 130a and 130b are single-layer interference AR coatings made of $MgF_2$ ($n_D \approx 1.37$), respective design wavelength ranges centered at 550 nm and 450 nm may be achieved using respective thicknesses $d_1$ and $d_2$ of around 100 nm and around 82 nm as shown below:

$$d_1 = \frac{\frac{n_{air}}{n_{coating}} * \lambda_1}{4} = \frac{\frac{1.00}{1.37} * 550}{4} \approx 100 \text{ nm} \quad \text{(Expression 1)}$$

$$d_2 = \frac{\frac{n_{air}}{n_{coating}} * \lambda_2}{4} = \frac{\frac{1.00}{1.37} * 450}{4} \approx 82 \text{ nm} \quad \text{(Expression 2)}$$

In the above examples represented by Expressions 1 and 2, the two AR coatings 130a and 130b are single-layer interference AR coatings made of $MgF_2$ ($n_D \approx 1.37$). However, it is contemplated that the materials and structures and even the principles of operation of the first and second AR coatings 130a, 130b may differ, as long as the first and second AR coatings 130a and 130b have different design wavelength ranges.

It should be noted that the above description is somewhat simplified for ease of explanation. For example, the reflection rays $r_1$ and $r_2$ may experience an additional 180° phase shift that is not experienced by the reflection rays $r_3$ and $r_4$, due to the interfaces 132a and 134a being interfaces going from low to high index of refraction relative to the incoming light i. However, since both the reflection ray $r_1$ and the reflection ray $r_2$ experience the same additional phase shift, the additional phase shift does not affect the destructive interference between the reflection rays $r_1$ and $r_2$.

Figure 3:
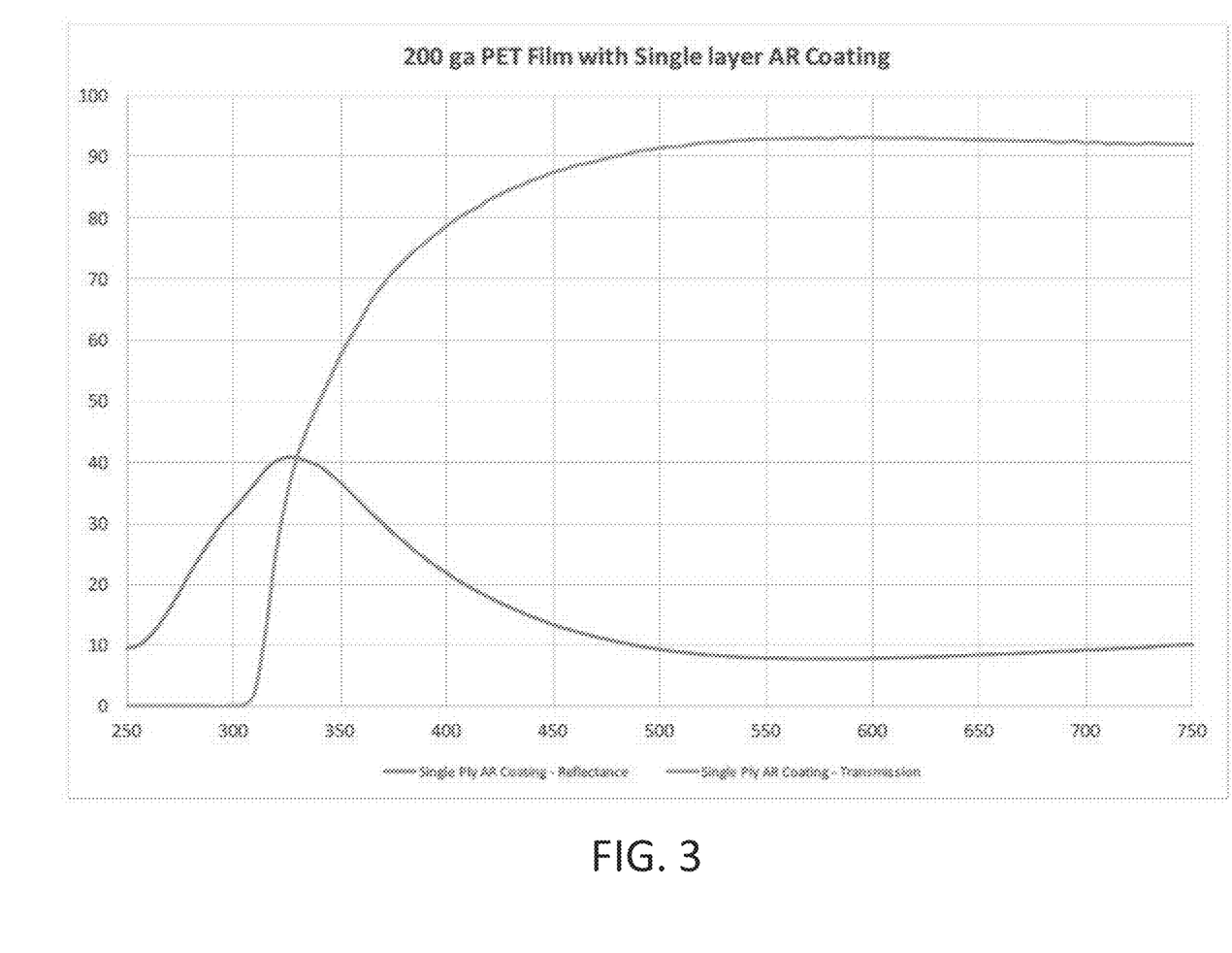
FIG. 3 is a graphical representation of normal-incidence reflectance as a function of wavelength for a transparent covering comprising a 200-gauge polyethylene terephthalate (PET) lens with an anti-reflective (AR) coating.

FIG. 3 is a graphical representation of normal-incidence reflectance as a function of wavelength for a transparent covering comprising a 200-gauge PET lens with an AR coating. Normal-incidence transmission as a function of wavelength is also shown. In the example of FIG. 3, the AR coating has a design wavelength range centered at around 550 nm (i.e. green light). The transparent covering of FIG. 3 exhibits normal-incidence reflectance of under 10% for all wavelengths between 500 nm and 700 nm. Because the reflectance is higher for wavelengths shorter than 500 nm, rising to over 20% while still within the range of human vision (which extends down to around 390 nm), the transparent covering of FIG. 3 produces a perceivable blue or violet reflection.

Figure 4:
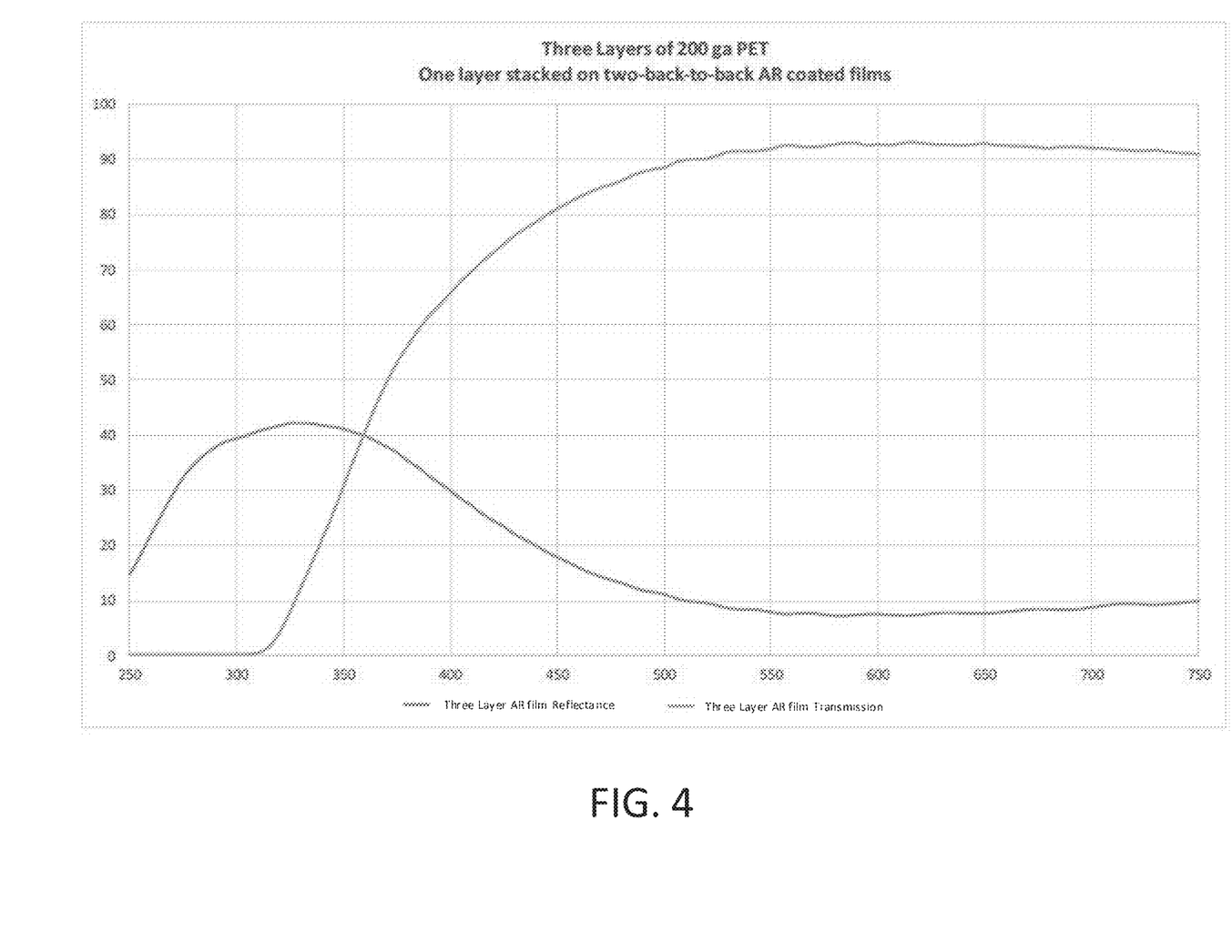
FIG. 4 is a graphical representation of normal-incidence reflectance as a function of wavelength for a transparent covering comprising a stack of three layered 200-gauge PET lenses with AR coatings on the outermost lenses, the AR coatings having the same design wavelength range.

FIG. 4 is a graphical representation of normal-incidence reflectance as a function of wavelength for a transparent covering comprising a stack of three layered 200-gauge PET lenses with AR coatings on the outermost lenses. Normal-incidence transmission as a function of wavelength is also shown. The transparent covering of FIG. 4 may have the structure of the transparent covering 100 shown in FIGS. 1 and 2 with a third layer 110 between the layers 110a, 110b, except that, in the example of FIG. 4, the AR coatings have the same design wavelength range as each other (unlike the AR coatings 130a, 130b of FIG. 1). As in the example of FIG. 3, the design wavelength range of the AR coatings of FIG. 4 is centered at around 550 nm (i.e. green light). In this case, however, due to internal reflections between the three PET lenses, the reflectance is somewhat worse in the low wavelength end, rising to over 30% while still within the range of human vision (which extends down to around 390 nm). Significant blue or violet reflections may be observed despite the use of two AR coatings.

Figure 5:
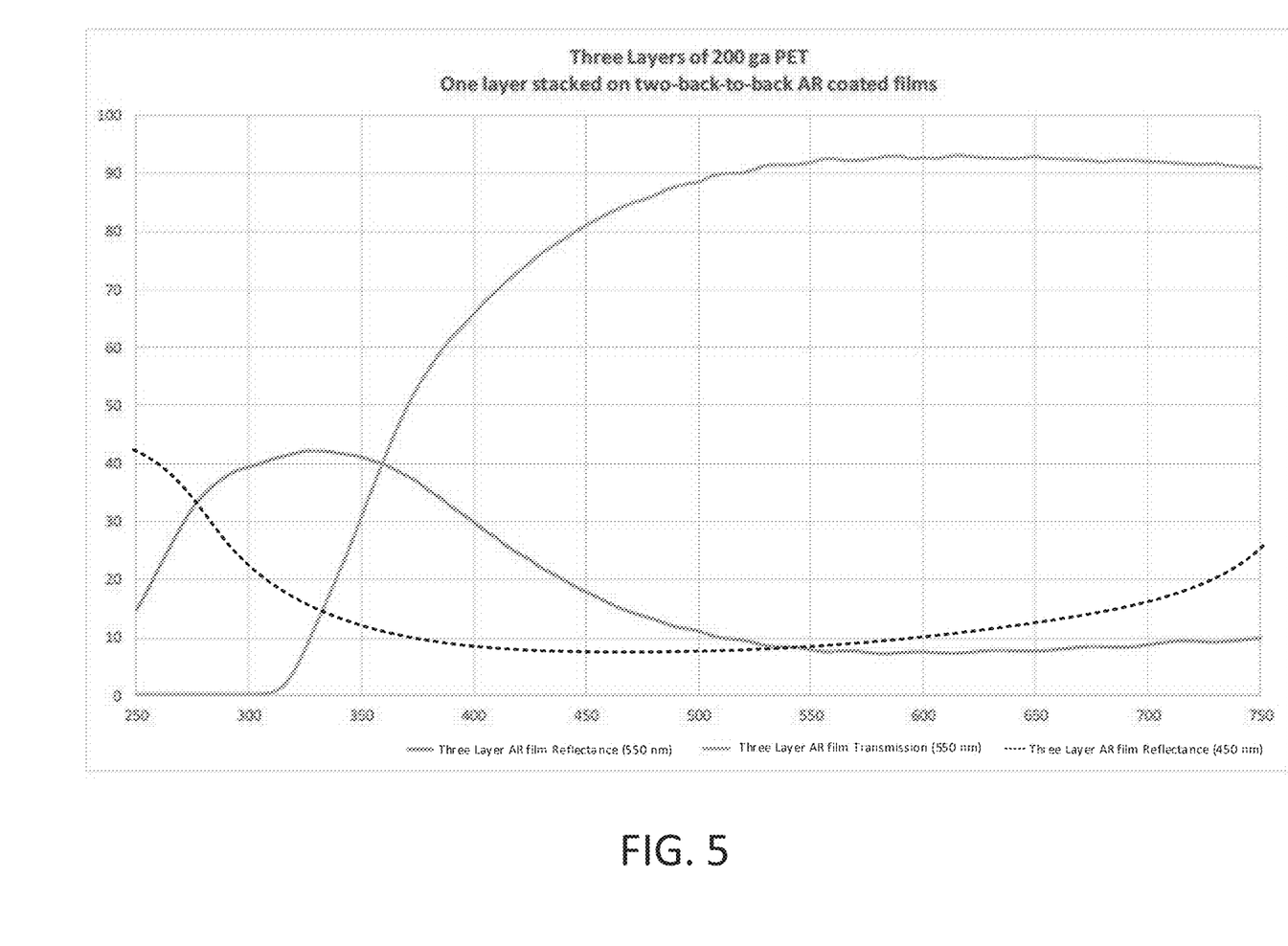
FIG. 5 is a graphical representation of normal-incidence reflectance as a function of wavelength for the transparent covering of FIG. 4 in which a comparison is shown between using AR coatings having a design wavelength range centered at 550 nm and using AR coatings having a design wavelength range centered at 450 nm.

FIG. 5 is the same as FIG. 4 except that FIG. 5 further depicts an additional curve shown as a dashed line. The dashed line represents normal-incidence reflectance as a function of wavelength for the same transparent covering, but with AR coatings having a design wavelength range centered at 450 nm used in place of the AR coatings having a design wavelength range centered at 550 nm. As can be seen, by using AR coatings having a design wavelength centered at 450 nm, the entire reflectance curve may be shifted to the left, thus improving the reflectance for low wavelengths. As shown, reflectance is under 10% all the way down to around 390 nm before rising for lower wavelengths outside the range of human vision. While this may greatly reduce or eliminate the perceivable blue or violet reflection, it comes at the expense of increasing reflectance at higher wavelengths (e.g. reflectance over 15% at around 700 nm), thus introducing a red reflection that was not perceivable using the AR coatings of FIG. 4. The choice between AR coatings centered at around 550 nm and AR coatings centered at around 450 nm thus represents a tradeoff between unwanted reflections of different colors.

In order to avoid the above tradeoff and eliminate reflections over a broader range of wavelengths, the transparent covering 100 shown in FIGS. 1 and 2 makes use of two different AR coatings 130a, 130b having different design wavelength ranges. For example, the two AR coatings compared in FIG. 5 may be combined in a single transparent covering 100, with one AR coating on a first outermost lens 110a of the stack (e.g. the top lens 110a in FIGS. 1 and 2) and the other AR coating on a second outermost lens 110b of the stack (e.g. the bottom lens 110b in FIGS. 1 and 2). The transparent covering 100 may thus have a first AR coating 130a with a first design wavelength range centered at around 550 nm and a second AR coating 130b with a second design wavelength range centered at around 450 nm. In this way, reflections can be prevented both for low wavelengths below 500 nm and for high wavelengths above 600 nm.

Figure 6:
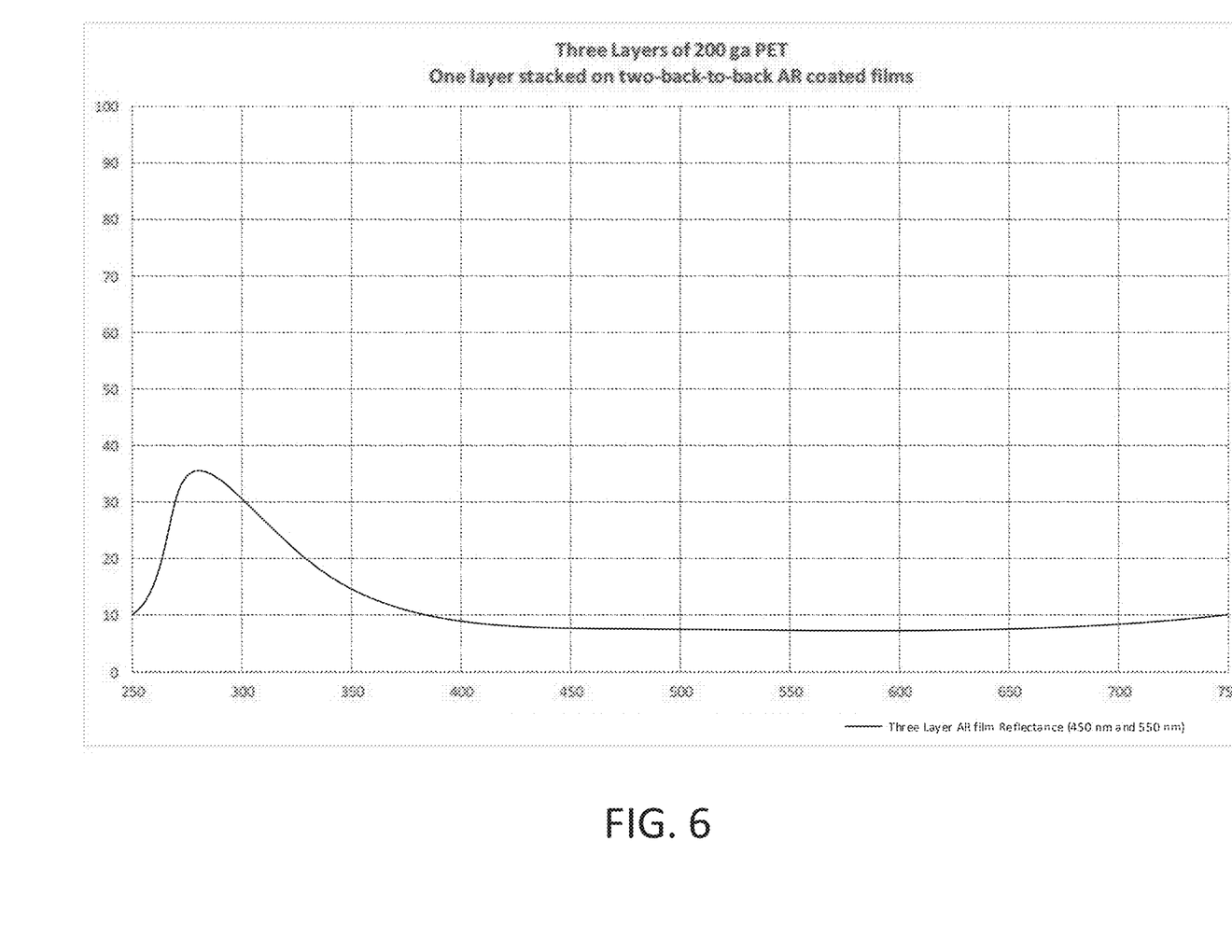
FIG. 6 is a graphical representation of normal-incidence reflectance as a function of wavelength for a transparent covering comprising three layered 200-gauge PET lenses with AR coatings on the outermost lenses, the AR coatings having different design wavelength ranges.

FIG. 6 illustrates the resulting reflectance as a function of wavelength. The same transparent covering comprising three layered 200-gauge PET lenses with AR coatings on the outermost lenses is used, but with the AR coatings having design wavelength ranges centered at around 550 nm and 450 nm, respectively. As can be seen, the transparent covering of FIG. 6 exhibits normal-incidence reflectance of under 10% for all wavelengths between 390 nm and 700 nm.

The design wavelength ranges of the AR coatings 130a, 130b need not be centered at 550 nm and 450 nm but may be centered at any appropriate design wavelengths for the particular application. For example, if red reflection is not a problem but ultraviolet reflection is, the design wavelength ranges may be further shifted to lower wavelengths, e.g. centered at 450 nm and 300 nm, respectively. Non-overlapping design wavelength ranges are also envisioned, such as where it is desired to reduce reflections of red and blue/violet light but to allow reflections of green light, which may be achieved, for example, by using design wavelength ranges centered at 750 nm and 250 nm, respectively. By combining the effects of the two AR coatings 130a, 130b having different design wavelength ranges in this way, reflections over a broad range of wavelengths may be eliminated using relatively inexpensive AR coatings such as single-layer interference coatings made of $MgF_2$.

In the above examples, the external environment of the transparent covering 100 is assumed to be air having an index of refraction of around 1.00. However, it is also contemplated that the external environment may not be air. For example, in the case of a transparent covering 100 for a window of an underwater building or vehicle, the external environment may be water having a higher index of refraction. In some instances, the external environment may even be vacuum having a lower index of refraction than air. The above selection of AR coatings 130a, 130b can be made accordingly, with $n_{air}$ referring generally to the index of refraction of the external medium.

In the above examples, the transparent covering 100 is described as being affixed to some substrate. However, it is also contemplated that the transparent covering 100 itself may be used without an underlying substrate, for example, affixed at its periphery to a surrounding wall or garment, such as is described in relation to FIG. 6C of U.S. Patent Application Pub. No. 2018/0029337, the entire contents of which is expressly incorporated herein by reference.

Throughout this disclosure, the word "transparent" is used broadly to encompass any materials that can be seen through. The word "transparent" is not intended to exclude translucent, hazy, frosted, colored, or tinted materials.

The AR coatings 130a, 130b described throughout this disclosure may be applied according to known methods such as spin coating, dip coating, or vacuum deposition.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A transparent covering affixable to a substrate, the transparent covering comprising:
   a stack of two or more lenses;
   an adhesive interposed directly between each pair of adjacent lenses from among the two or more lenses;
   a first anti-reflective coating on a first outermost lens of the stack, the first anti-reflective coating having a first design wavelength range; and
   a second anti-reflective coating on a second outermost lens of the stack opposite the first outermost lens, the second anti-reflective coating having a second design wavelength range that is different from the first design wavelength range,
   wherein the transparent covering exhibits normal-incidence reflectance of under 10% for all wavelengths between 390 nm and 700 nm owing to the combined effects of the first and second anti-reflective coatings, neither the first nor the second anti-reflective coating individually providing the transparent covering with a normal-incidence reflectance of under 10% for all wavelengths between 390 nm and 700 nm.

2. The transparent covering of claim 1, wherein the first design wavelength range is centered at around 550 nm and the second design wavelength range is centered at around 450 nm.

3. The transparent covering of claim 1, wherein the first anti-reflective coating and the second anti-reflective coating have different thicknesses.

4. The transparent covering of claim 3, wherein the first anti-reflective coating comprises a film of magnesium fluoride ($MgF_2$) having a thickness of around 100 nm and the second anti-reflective coating comprises a film of magnesium fluoride ($MgF_2$) having a thickness of around 82 nm.

5. The transparent covering of claim 1, wherein the first anti-reflective coating and the second anti-reflective coating are single-layer interference coatings.

6. A transparent covering comprising:
   a first lens;
   a second lens stacked on the first lens;
   an adhesive interposed directly between the first lens and the second lens;
   a first anti-reflective coating on the first lens, the first anti-reflective coating having a first design wavelength range; and
   a second anti-reflective coating on the second lens, the second anti-reflective coating having a second design wavelength range that is different from the first design wavelength range,
   wherein the transparent covering exhibits normal-incidence reflectance of under 10% for all wavelengths between 390 nm and 700 nm owing to the combined effects of the first and second anti-reflective coatings, neither the first nor the second anti-reflective coating individually providing the transparent covering with a normal-incidence reflectance of under 10% for all wavelengths between 390 nm and 700 nm.

7. The transparent covering of claim 6, wherein the first design wavelength range is centered at around 550 nm and the second design wavelength range is centered at around 450 nm.

8. The transparent covering of claim 6, wherein the first anti-reflective coating and the second anti-reflective coating have different thicknesses.

9. The transparent covering of claim 8, wherein the first anti-reflective coating comprises a film of magnesium fluoride ($MgF_2$) having a thickness of around 100 nm and the second anti-reflective coating comprises a film of magnesium fluoride ($MgF_2$) having a thickness of around 82 nm.

10. The transparent covering of claim 6, wherein the first anti-reflective coating and the second anti-reflective coating are single-layer interference coatings.

11. A method comprising:
    stacking two or more lenses;
    interposing an adhesive directly between each pair of adjacent lenses from among the two or more lenses;
    applying a first anti-reflective coating on a first outermost lens of the stack, the first anti-reflective coating having a first design wavelength range; and
    applying a second anti-reflective coating on a second outermost lens of the stack opposite the first outermost lens, the second anti-reflective coating having a second design wavelength range that is different from the first design wavelength range,
    wherein a transparent covering including the two or more lenses, adhesive(s), first anti-reflective coating, and second anti-reflective coating exhibits normal-incidence reflectance of under 10% for all wavelengths between 390 nm and 700 nm owing to the combined effects of the first and second anti-reflective coatings, neither the first nor the second anti-reflective coating individually providing the transparent covering with a normal-incidence reflectance of under 10% for all wavelengths between 390 nm and 700 nm.

12. The method of claim 11, wherein the first design wavelength range is centered at around 550 nm and the second design wavelength range is centered at around 450 nm.

13. The method of claim 11, wherein the first anti-reflective coating and the second anti-reflective coating have different thicknesses.

14. The method of claim 13, wherein the first anti-reflective coating comprises a film of magnesium fluoride ($MgF_2$) having a thickness of around 100 nm and the second anti-reflective coating comprises a film of magnesium fluoride ($MgF_2$) having a thickness of around 82 nm.

15. The method of claim 11, wherein the first anti-reflective coating and the second anti-reflective coating are single-layer interference coatings.

16. The method of claim 11, further comprising affixing the transparent covering to a substrate.

17. The method of claim 11, further comprising affixing the transparent covering to a surrounding wall or garment.

* * * * *